United States Patent [19]

Oliver

[11] Patent Number: 4,490,586
[45] Date of Patent: Dec. 25, 1984

[54] TELEPHONE EAR PIECE LOCK

[76] Inventor: Melvin D. Oliver, 4310 N. Carlisle St., Philadelphia, Pa. 19140

[21] Appl. No.: 419,526

[22] Filed: Sep. 17, 1982

[51] Int. Cl.³ .............................................. H04M 1/66
[52] U.S. Cl. ................................... 179/189 R; 179/187
[58] Field of Search ............... 179/189 R, 182 R, 187, 179/188

[56]  References Cited
U.S. PATENT DOCUMENTS

| 725,338 | 4/1903 | Head. | |
| 1,083,569 | 1/1914 | Hoevenberg et al. | |
| 1,138,389 | 5/1915 | Luby. | |
| 1,866,429 | 7/1932 | Stabili | 179/189 R |
| 2,615,322 | 10/1952 | Gazda. | |
| 3,301,969 | 1/1967 | Darling et al. | |

FOREIGN PATENT DOCUMENTS 134795  9/1933  Austria.

Primary Examiner—Gene Z. Rubinson
Assistant Examiner—L. Schroeder
Attorney, Agent, or Firm—Karl L. Spivak

[57]  ABSTRACT

A telephone ear piece lock is disclosed to prevent unauthorized use of a protected telephone instrument. The ear piece lock includes a rim mounting bracket that is permanently affixed near the receiver end of the telephone and has a flat arm radially outwardly extending therefrom. The arm is provided with a transverse slot for instrument locking purposes. A disc-like cover overfits the receiver end to function as a sound barrier when tightly held over the receiver end. A bent locking finger extends from the cover and is configured to insert through the bracket slot. The locking finger is provided with an opening to receive a portion of a portable lock therethrough, the lock serving to prevent removal of the cover from its shielding position over the telephone receiver end.

4 Claims, 3 Drawing Figures

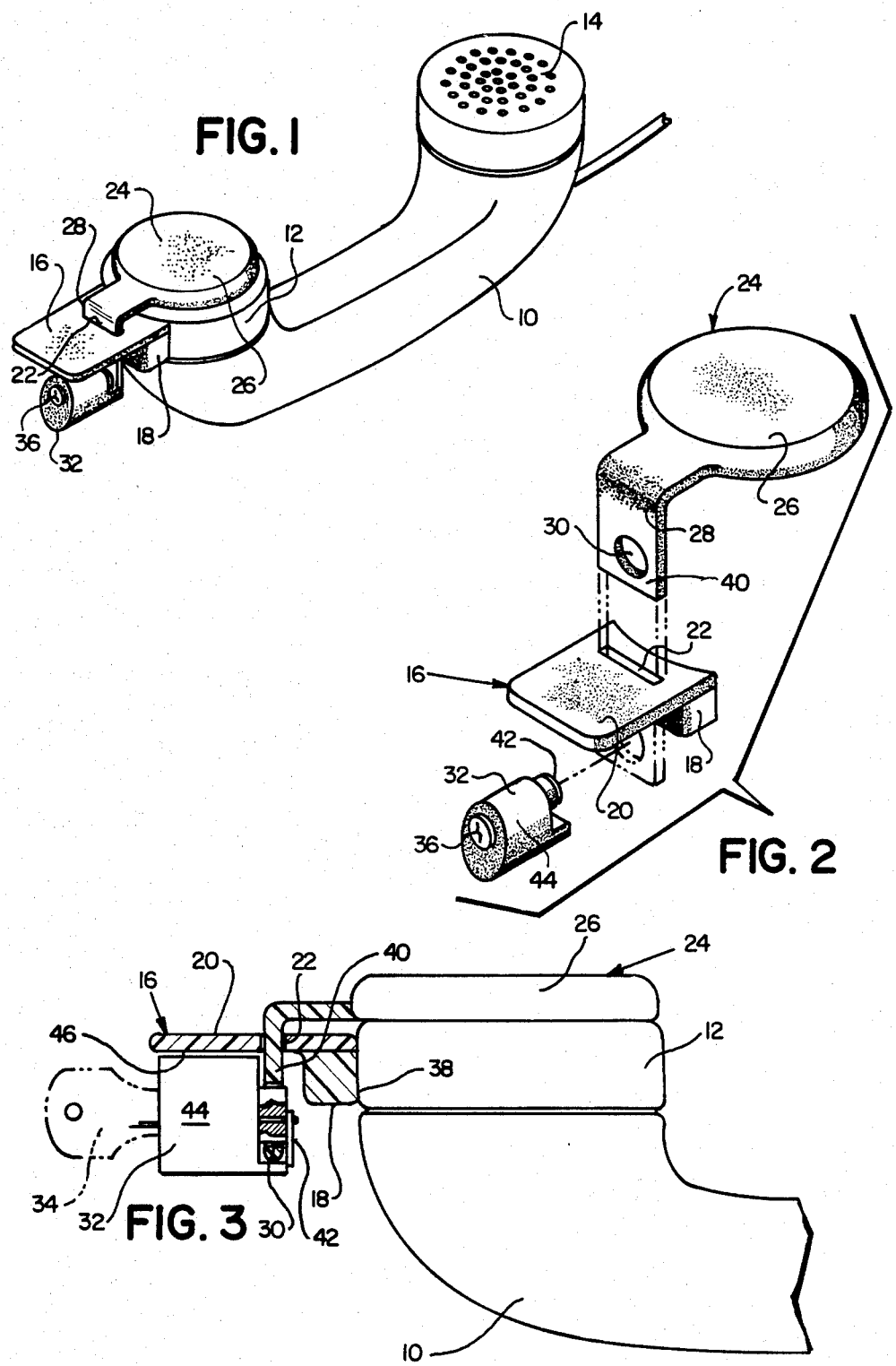

TELEPHONE EAR PIECE LOCK

BACKGROUND OF THE INVENTION

The present invention relates generally to the field of locking devices for telephones, and more particularly, is directed to an ear piece locking device to prevent unauthorized telephone calls from a selected, protected instrument.

Telephone instruments of the type popularly now in use include generally in combination a hand carried portion containing a speaker or transmitting end and a receiver or hearing end and a base including a receiver cradle and either a pushbutton or circular type dialing system. In the case of large private and semi-public areas, for example, in businsess offices, it is the usual practice to install numerous telephone instruments throughout for use by employees during business hours. Many of these telephones are located in relatively quiet areas during the day and are usually completely unprotected at night. Such telephones have frequently been subject to abuse and there are numerous documented instances wherein unauthorized persons have utilized such available telephones to make costly long-distance calls, completely unknown to and unauthorized by the owner of the business or other premises.

Accordingly, in order to prevent such unauthorized telephone use, various types of locking devices have been developed by prior workers in the art and these devices usually include such protecting constructions as a dial lock, a speaker cover, a cradle protecting device or the like. While the prior art locking systems have proved effective to a considerable degree, it has been found that the prior art devices are usually designed for use with a single type of instrument and that a locking device that may successfully employed upon the telephone instrument construction of one manufacturer will not necessarily be effective to protect the telephone instrument of a second manufacturer, or even different models of the same manufacturer.

Accordingly, the need remains to provide an efficient telephone protection system that can be easily and effectively employed to prevent unauthorized calls in a wide variety of telephone instrument designs.

SUMMARY OF THE INVENTION

The present invention relates generally to the field of telephone protection devices, and more particularly, is directed to a universal telephone ear piece lock which is adapted for use with a wide variety of telephone instrument designs.

The present invention includes in combination a removable, lockable ear piece or receiver cover that can be easily, releasably secured over the telephone ear piece or receiver to act as an effective sound barrier. With the ear piece cover securely fastened in place, it will be found that the telephone instrument cannot be used inasmuch as there is no way of determining whether or not a dial tone is sounding. Additionally, there is no way of hearing any vocal responses that may be transmitted over an open line. Accordingly, even though the dial, the cradle and the speaker or mouth piece of a telephone instrument are completely unencumbered and unprotected, the removable ear piece cover of the present invention, when locked in position, can effectively prevent unauthorized use of a telepone instrument.

The telephone ear piece lock of the present invention includes in combination a rim mounting bracket which can be readily affixed to the periphery of a telephone ear piece by utilizing a suitable adhesive or a suitable mechanical fastener. It is not the intention of this invention to provide a completely tamper proof locking system, but rather, to provide a barrier or deterrent to unauthorized use that must be broken or otherwise mistreated in order to use the telephone. Accordingly, while unauthorized use will not necessarily be permentently prevented, such unauthorized use will be readily detected because the locked parts must be broken or otherwise separated in order to utilize the telephone instrument.

The rim mounting bracket includes an arm or flat flange which is configured to extend radially outwardly from the periphery of the ear piece and is provided with a transverse slot or opening for locking purposes. It is intended that the rim mounting bracket will be permanently affixed to the telephone earpiece in position to receive and secure a removable ear piece cover for locking purposes whenever so desired. A removable cover of size and configuration to tightly overfit the telephone ear piece includes an integral locking finger which terminates outwardly in a bent locking section. The locking section is designed of size and configuration to fit within and be secured within the rim mounting bracket slot. The bent locking section of the locking finger is provided with an opening, which opening, when the ear piece cover is properly set to shield the ear piece, is positioned rearwardly of the flat flange of the mounting bracket. A separate cylinder type lock can then be inserted through the opening in the bent locking section behind the flat flange to securely lock the parts together in a manner to prevent use of the instrument by completely shielding the telephone ear piece.

When it is again desired to use the telephone, the lock cylinder is simply unlocked and removed to thereby permit the removable cover to be disassociated from the telephone receiver and thus leave the telephone ear piece free for use.

It is therefore an object of the present to provide an improved telephone locking system of the type set forth.

It is another object of the present invention to provide a novel locking system that is universally adaptable for use with a wide variety of telephone instruments.

It is another object of the present invention to provide a novel telephone ear piece lock device designed to shield or baffle the telephone receiver without interfering with the remaining operating portions of the telephone.

It is another object of the present invention to provide an novel telephone ear piece lock device including a permanently mounted bracket affixed to the telephone receiver adjacent to the ear piece, the bracket including a slot therein, and a removable cover having a bent finger, the finger being insertable through the bracket slot to receive a locking device in a manner to releasably secure the cover over the ear piece.

It is another object of the present invention to provide a novel telephone ear piece lock that is simple in design, inexpensive in manufacture and capable of effectively preventing unauthorized telephone use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view showing the ear piece lock of the present invention installed upon a telephone receiver.

FIG. 2 is an enlarged, exploded, perspective view of the ear piece lock of FIG. 1.

FIG. 3 is an enlarged, partial, side elevational view of the ear piece lock installed upon a telephone ear piece, partly in section and partially broken away to expose interior construction details.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIGS. 1, 2 and 3 a telephone ear piece lock installed upon the receiver or hearing end 12 of a telephone instrument 10. As illustrated, the speaker or transmitter end 14 and the telephone cradle (not illustrated) are completely unobstructed and not effected by the locking system of the present invention.

Referring particularly to FIGS. 2 and 3, the locking system includes a rim mounting bracket 16 having an integral, shaped base 18 of partial arcuate configuration to securely mount upon the outer periphery of the ear piece 12 in a secure manner, for example, by employing a suitable adhesive 38. An arm or flat flange 20 integrally extends from the base 18 and preferably is formed of molded plastic construction to simplify production procedures. The arm 20 is provided with a transverse slot or opening 22 of length greater than its width. It is intended that the rim mounting bracket 16 will remain permanently affixed to the telephone instrument adjacent to the hearing end 12 so that the slot 22 will be continually available for telephone instrument locking purposes in the manner hereinafter more fully set forth.

An ear piece shield 24 of cooperating construction to lock within the slot 22 of the mounting bracket is preferably formed of molded plastic material to include a circular cover 26 of dimensions and configuration to tightly overfit the face of the telephone ear piece 12 in a manner to substantially shield the ear piece to prevent the passage of sounds therethrough. A bent locking finger 28 radially outwardly extends from the periphery of the cover 26 and terminates in a downwardly bent locking section 40. See FIG. 2. As illustrated, the locking section is drilled or otherwise treated to provide a lock opening 30. It is a feature of this invention to form the locking finger 28 and the locking section 40 of flat, generally rectangular construction of size to easily and strongly fit within the opening provided in the bracket flat flange 20. When the locking section 40 is inserted fully through the flat flange opening 22, the ear piece shield 24 will be pulled into tight engagement with the periphery of the receiver 12 to successfully prevent passage of sounds therethrough. If desired, a gasket (not shown) or other sound deadening construction could be employed at this junction.

As illustrated in the drawings, a portable cylinder type lock 32 of configuration to seat within the lock opening 30 is provided on the side of the flat flange 20 remote from the ear piece cover 26. Accordingly, when the bent locking section 40 is fully seated within the mounting bracket slot 22 in the manner illustrated in FIG. 3, the lock 32 can then be aligned with the lock opening 30 and positioned therethrough for locking purposes. In order to secure the lock 32 in locking arrangement, a key 34 can be inserted into the key slot 36 in known manner to rotate the lock tongue 42 to engage behind the bent section 40 and thereby prevent the lock from being disassociated from the lock opening 30. In this position, the lock body 44 will be substantially in contact with the underside 46 of the arm or flat flange 20 to thereby prevent relative movement of the ear piece shield 24 relative to the rim mounting bracket 16 when the parts are locked.

It is anticipated that any unauthorized user would not have a key 34 and accordingly, could therefore not remove the lock 32 from within the lock opening 30. Because of this, the cover 26 will remain affixed over the surface of the reciever or hearing end 12 and thereby prevent sounds from passing therethrough. As above set forth, the locking system of the present invention is not intended as a permanent, fool proof lock, but rather is designed as a deterrent to discourage unauthorized use. A determined user could of course break the adhesive bond between the bracket base 18 and the periphery of the reciever 12 to gain access to the reciever. Also, inasmuch as the parts are contemplated as being fabricated of plastic materials, they are subject to breaking or cutting. However, in either instance, permanent physical damage would have to be done prior to using the telephone instrument 10, thereby leaving permanent evidence of the unauthorized use. In most instances such a construction will effectively deter such unauthorized use and thereby serve the intended purpose.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A telephone locking device for locking over the receiver end of a telephone instrument comprising
   a shield means overfitting the receiver end of the telephone instrument to prevent passage of sound therethrough,
      the shield means comprising a generally circular, disk-like cover and a non-movable locking finger integrally extending outwardly from the cover, the locking finger being provided with a lock opening, the opening being spaced from the cover; and
   a bracket means permanently secured to the periphery of the telephone instrument near the said end to receive the locking finger,
      the bracking means comprising a base and a flat, non-movable arm extending therefrom, the arm having a longitudinal axis, the arm being provided with a slot, the said slot being oriented at right angles to the longitudinal axis of the arm,
      the slot being positioned to receive therethrough the portion of the locking finger having the lock opening whereby when the disk-like cover is positioned on one side of the bracket means flat arm the lock opening will be positioned on the side of the flat arm; and a portable lock insertable through the lock opening and being lockable therein, whereby removal of the locking finger from the flat arm can be prevented.

2. The telephone locking device of claim 1 wherein the locking finger comprises a bent locking section in spaced relation from the cover, the bent locking section being bent through ninety degrees from the plane of the cover and wherein the lock opening is provided in the bent locking section.

3. The telephone locking device of claim 2 wherein the arm extends radially outwardly from the said receiver end and wherein the bent locking section is formed to a generally rectangular configuration.

4. The telephone locking device of claim 3 wherein the portable lock comprises a body, the body being in contact with a portion of the flat arm when another portion of the lock is inserted through the lock opening, whereby relative movement between the shield means and the end of the telephone is prevented.

* * * * *